United States Patent
Antonuk et al.

(10) Patent No.: US 7,267,272 B2
(45) Date of Patent: Sep. 11, 2007

(54) VARIABLE STRIDE BIT BLITTING

(75) Inventors: Larry Antonuk, Marlborough, NH (US); Chris Sullivan, Keene, NH (US); Glenn Scadova, Swanzey, NH (US)

(73) Assignee: Markem Corporation, Keene, NH (US)

(*) Notice: Subject to any disclaimer, the term of this patent is extended or adjusted under 35 U.S.C. 154(b) by 128 days.

(21) Appl. No.: 10/952,189

(22) Filed: Sep. 28, 2004

(65) Prior Publication Data

US 2006/0065725 A1    Mar. 30, 2006

(51) Int. Cl.
*G06F 19/00* (2006.01)
(52) U.S. Cl. ............ 235/385; 235/462.01; 235/462.09; 235/462.25
(58) Field of Classification Search ........... 235/462.01, 235/462.08, 383, 385, 462.26, 462.1
See application file for complete search history.

(56) References Cited

U.S. PATENT DOCUMENTS

| | | | |
|---|---|---|---|
| 6,115,508 A * | 9/2000 | Lopresti et al. ............. 382/306 |
| 6,186,406 B1 * | 2/2001 | Ackley ........................ 235/494 |
| 6,201,901 B1 * | 3/2001 | Zhou et al. .................. 382/306 |
| 6,377,261 B1 * | 4/2002 | Fernandez et al. .......... 345/467 |
| 6,565,003 B1 * | 5/2003 | Ma ............................ 235/462.1 |
| 6,732,928 B1 * | 5/2004 | Lawlor ................... 235/462.01 |
| 6,869,015 B2 * | 3/2005 | Cummings et al. .... 235/462.25 |
| 7,025,268 B2 * | 4/2006 | Alleshouse ............ 235/462.01 |

* cited by examiner

*Primary Examiner*—Ahshik Kim
(74) *Attorney, Agent, or Firm*—Fish & Richardson P.C.

(57) ABSTRACT

A method for marking an article of merchandise with content represented by a bitmap stored in a source array of a source memory includes identifying, within a destination memory, a destination array. The destination array has a first region having boundaries aligned with boundaries of a first data chunk of the destination memory, and a second region having boundaries aligned with a second data chunk of the destination memory, the second data chunk being smaller than the first data chunk. A first region of the source array is copied onto the first region of the destination array in units of the first data chunk, and a second region of the source array is copied onto the second region of the destination array in units of the second data chunk.

15 Claims, 5 Drawing Sheets

VARIABLE STRIDE BIT BLITTING

FIELD OF INVENTION

The invention relates to package-marking systems, and in particular, to systems for marking packages with dynamically varying information.

BACKGROUND

Manufactured goods are typically enclosed in packages that are marked with information pertaining to the goods. Such information might include data identifying what goods are in the package, when and where they were manufactured, and perhaps a serial identifier to uniquely identify the contents of the package. This information can be human readable, such as text, or machine readable, such as a bar code.

Because of the volume of packages that must be marked, it is customary to provide a computer-controlled marking device that imprints information either directly on the package or on a label that is peeled off and applied to the package. The marking device preferably operates quickly enough so that the packages can be marked as they are packaged. This rate is referred to as "line speed."

In cases in which the information to be marked on the package changes frequently, the marking device is likewise updated frequently. This updating step preferably occurs quickly enough so that the marking device can continue to operate at line speed.

The process of providing updated information to the marking device typically includes retrieving data from one memory and transferring that data to a memory associated with the marking device. This transfer of data should occur quickly enough so that by the time the package arrives at the marking device, the marking device is ready to mark that package with updated information.

SUMMARY

In one aspect, the invention includes a method for marking an article of merchandise with content represented by a bitmap stored in a source array of a source memory. The method includes identifying, within a destination memory, a destination array. The destination array has a first region having boundaries aligned with boundaries of a first data chunk of the destination memory, and a second region having boundaries aligned with a second data chunk of the destination memory, the second data chunk being smaller than the first data chunk. A first region of the source array is copied onto the first region of the destination array in units of the first data chunk, and a second region of the source array is copied onto the second region of the destination array in units of the second data chunk.

Some embodiments include the additional step of providing the destination array to a marking device for marking the article with content represented by the destination array. The first and second data chunks can be a byte and a bit respectively. Alternatively, the first data chunk can be a word and the second data chunk can be a byte. Or, the first data chunk can be a long word and the second data chunk can be a word.

In another embodiment, the method includes defining a third region of the source array. The third region has boundaries aligned with third data chunk boundaries of the destination memory. This third data chunk is smaller than the second data chunk. The third region of the source array is then copied onto a third region of the destination array in units of the third data chunk.

In the foregoing embodiment, the first, second, and third data chunks can be a word, a byte, and a bit respectively.

Other embodiments include those in which copying a first region of the source array includes copying an integral number of first data chunks from a selected row of the source bitmap. These other embodiments include those in which copying a second portion of the source array includes copying second data chunks from the selected row of the source array.

Other embodiments include those in which the orientation of the bitmap is changed. These embodiments include those in which first and second regions of the destination array are selected such that the bitmap is stored in the destination array with an orientation different from the orientation in which the bitmap is stored in the source array. The change in orientation can result from a rotation by a right angle relative to the orientation in which the bitmap is stored in the source array. The rotation can be a clockwise or a counter-clockwise rotation. Embodiments of the invention also include those in which copying a first region of the source array onto the first region of the destination array includes copying the first region in units of a two-dimensional block. This block has a length and width that are integral multiples of an extent of the first data chunk.

In another aspect, the invention includes a computer-readable medium having encoded thereon software for causing the marking of an article of merchandise with content represented by a bitmap stored in a source array of a source memory. The software includes instructions that, when executed by a computer, cause the computer to carry out any of the foregoing methods.

An additional aspect of the invention includes an apparatus for marking an article of merchandise. Such an apparatus includes a source and a destination memory for storage of a source array, and a destination array respectively. A processor is in data communication with the source memory and the destination memory, and a printer is in data communication with the destination memory. Also in communication with the processor is a computer-readable medium having encoded thereon software for causing the article of merchandise to be marked with content represented by a bitmap stored in the source array. The software includes instructions that, when executed by a computer, cause the computer to carry out any of the foregoing methods.

Other features and advantages of the invention will be apparent from the following detailed description, and the accompanying figures, in which:

DETAILED DESCRIPTION

Figure 1:
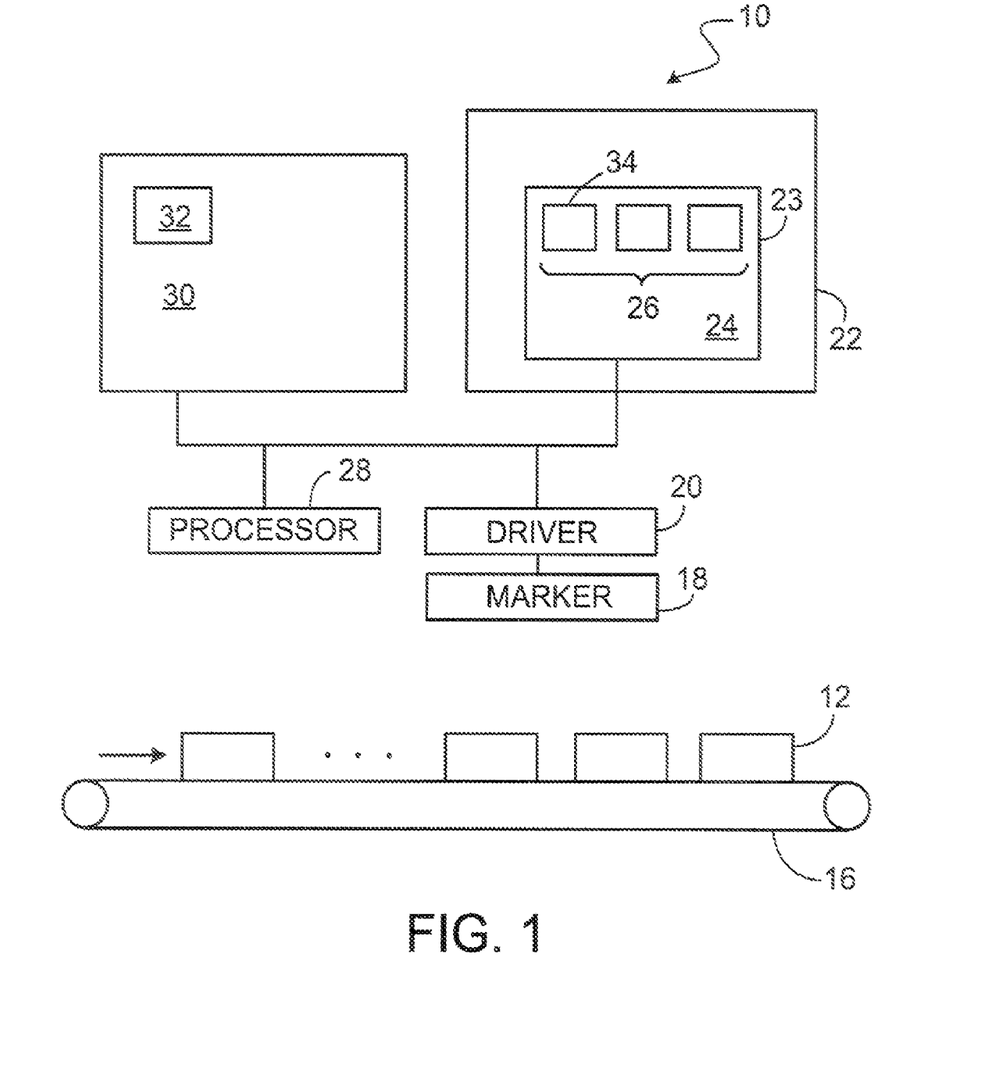
FIG. 1 is a block diagram of a system for marking packages.

FIG. 1 shows a system 10 for marking articles of merchandise 12 on a conveyor belt 16. As used herein, an article of merchandise includes, in addition to the merchandise itself, any structure for separating units of merchandise. Exemplary structures include packages, boxes, shrink-wrapping, palettes, containers, enclosures, bundles, or the like.

The system 10 includes a product-marking device 18 controlled by a driver 20 that is in communication with a destination memory 22. A suitable product-marking device 18 is a printer, such as an ink jet printer, a laser printer, an impact printer, a thermal printer, or any other type of printer. The marking device 18 can be disposed to mark the package 12 directly. Alternatively, the marking device 18 can be disposed to mark a label, which is then peeled off and applied to the package 12, either automatically or by hand.

The packages 12 can be moved past the marking device 18 on a conveyor belt 16 or similar structure, as shown in FIG. 1, or the marking device 18 can be moved past stationary packages. In some applications, the marking device 18 can be a handheld printer, in which case packages are marked manually rather than automatically.

The destination memory 22 contains data 23, typically in the form of a bit map, representative of a mark to be used for identifying the package 12. The driver 20 reads the destination memory 22 and translates this data 23 into instructions to be executed by the marking device 18. For brevity, the data 23 representative of the mark will be referred to as the mark 23.

In a typical application, the mark 23 includes a static portion 24, which stays the same from one package 12 to the next, and a dynamic portion 26, which changes frequently, in some cases with each package 12. For example, in some cases, a serial identifier is to be printed on the package 12. In such cases, the dynamic portion 26 of the mark 23 includes the serial identifier.

Since the mark 23 changes during operation of the belt 16, it follows that the contents of the destination memory 22 will also change. However, in many applications, the static portion 24 of the mark 23, which remains the same across all packages 12, is much larger than the dynamic portion 26 of the mark 23. Under these circumstances, it is inefficient to overwrite all of the destination memory 22 with the next mark 23. Instead, only the dynamic portion 26 is overwritten. These dynamic portions 26 are selectively copied to the destination memory 22 to form a serial identifier.

The system also includes a processor 28 that has access to a source memory 30. The source memory 30 contains arrays of memory cells, referred to herein as "source arrays 32," that are assembled to form the dynamic portion 26 of the mark 23. For example, the source memory 30 may contain rectangular arrays of memory cells, each of which represents an alphanumeric character. These are selectively copied to the destination memory 22 to form a serial identifier.

Following the marking of an article 12, the processor 28 prepares the next mark 23. To do so, the processor 28 assembles the dynamic portion 26 of the next mark 23 in the destination memory 22. This typically includes causing selected source arrays 32 to be transferred to corresponding locations, referred to as "destination arrays 34," within the destination memory 22. For example, to increment the serial identifier for the next package 12, the processor 28 retrieves, from the source memory 30, the particular source array 32 that contains data representing the next character of the serial identifier. This source array 32 is used to replace a destination array 34 within the destination memory 22.

The process of preparing the dynamic portion 26 of the next mark 23 occurs as the next article 12 is being moved into position to be marked. To maximize throughput, it is desirable that the next mark 23 be ready by the time the article 12 is in a position to receive it. It is thus important that the dynamic portion 26 of the mark 23 be prepared as efficiently as possible.

Both the source memory 30 and the destination memory 22 are made of rows and columns of memory cells, each of which stores one bit. However, a processor 28 cannot access one bit at a time. For this reason, both the source and destination memory 22 are organized into larger data units. For example, eight consecutive memory cells in a row of either memory form a byte. A pair of consecutive bytes in a row of memory forms a word. And a pair of consecutive words in a row of memory forms a long word. Throughout this specification, the term "data chunk" is used to refer collectively to bytes, words, or long words.

To print a character at a specified location, it is necessary to copy the source array 32 that represents that character into a corresponding destination array 34 within the destination memory 22. The position of the destination array 34 within the destination memory 22 depends on the specified location. To provide the most flexibility, the destination array 34 can be located anywhere in the destination memory 22. Thus, in many cases, the first column of bits in the destination array 34 does not coincide with the beginning of a data chunk.

In some applications, it is necessary to consider what is already stored in the destination array 34 before overwriting it with the contents of the source array 32. This would arise, for example, if the destination array 34 were already storing a portion of a background image that was intended to show through gaps in a character represented by the source array 32.

To address this problem, one can OR each bit in the source array 32 with its corresponding bit in the destination array 34. However, as noted above, a processor 28 generally cannot access one bit of memory at a time. Instead, the processor 28 retrieves a byte (or other data chunk) that contains the desired bit in the source memory 30, retrieves another byte that contains the corresponding bit in the target memory, OR's the two bytes, and writes the result in the target memory.

If the first column of the target array were guaranteed to begin on a byte boundary, one could proceed by retrieving the next byte on the source array 32 and OR-ing that next byte with the corresponding next byte on the destination array 34. However, there is no guarantee that the target array will have its first column begin on a byte boundary. As a result, it is necessary to repeat the foregoing operation for each pixel in the destination array 34.

An alternative method for preparing a mark provides for performing a pixel-by-pixel transfer of data from the source array 32 to the destination array 34 only to the extent that the bit representing the pixel being transferred precedes the first byte boundary in the destination array 34. More generally, given a hierarchy of data chunks, with data chunks of one type being constituents of larger data chunks of another type, the transfer of data from the source array 32 to the destination array 34 occurs on a data-chunk-by-data-chunk basis to the extent that the data chunk being transferred precedes the first boundary, within the destination array, for the next larger type of data chunk.

Figure 2:
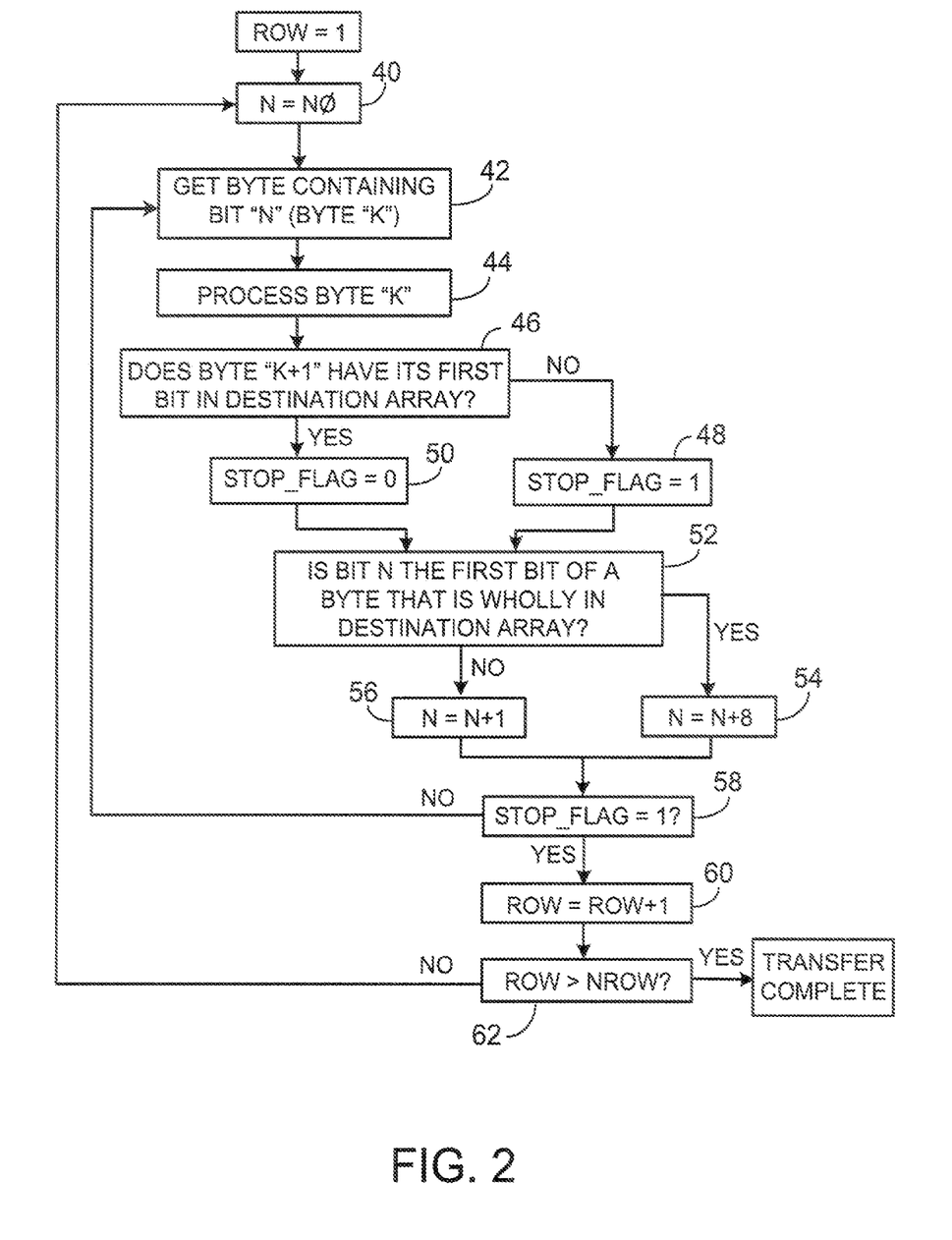
FIG. 2 is a method for copying information from a source memory to a memory associated with a marking device.

FIG. 2 is a flow chart of an exemplary procedure for transferring a rectangular source array 32 having Nrow rows and having a first column at bit $n_0$ in the destination array 34. A counter n is first set to $n_0$ (step 40). The byte from the source array 32 that contains bit n is then retrieved (step 42) and processed (step 44).

Processing the byte includes performing any logical operations between the byte containing bit n in the source array 32 and the contents of the corresponding byte in the destination array 34, followed by storing the result of the logical operation in the corresponding byte in the destination array 34.

The next byte is then examined to see if its first bit is within the destination array 34 (step 46). If it is not in the destination array 34, there will be no need to process that next byte, in which case a stop flag is set to indicate that the next byte need not be processed (step 48). Otherwise the stop flag is cleared (step 50).

After having processed the byte containing the nth bit, it is useful to determine whether that bit is the first bit of a byte that is within the destination array 34 (step 52). If it is not, the pointer is incremented by a long stride, which causes it to point to the first bit of the next byte (step 54). Otherwise the pointer is incremented by a short stride, which causes it to point to the next bit (step 56).

The method thus far has the effect of causing the pointer to traverse one row of the destination array 34, in a combination of short strides and long strides, depending on the outcome of step 52. The number of short strides is limited, in this case, to seven. At some point, however, the end of the current row in the destination array 34 will be reached. The stop flag was set in step 48 to indicate when this would occur. The next step is thus to check the stop flag (step 58) to determine whether to continue traversing a row. If the stop flag is clear, the procedure repeats with the next bit pointed to by the pointer (step 42). This pointer will have advanced along a row of memory cells by either a short stride (one bit) or a long stride (eight bits) depending on the outcome of the test in step 52. Otherwise, a row counter is incremented (step 60). If the row counter indicates that there are additional rows in the source array (step 62), the entire procedure is repeated (step 42) for the next row in the destination array 34.

The foregoing method thus switches between two different strides, a short stride corresponding to a bit and a long stride corresponding to a byte. The method advances by short strides until a data chunk boundary is reached in the destination memory 22. Once such a boundary is reached, the method advances by long strides, until it steps outside the destination away 34. However, the method can be used to switch strides corresponding to any two data chunks. For example, bytes could be substituted for bits, and words could be substituted for bytes. In that case, the short stride would be set to eight bits and the long stride would be set to sixteen bits. Or, words could be substituted for bits and long words could be substituted for bytes. In that case, the short stride would be set to sixteen bits and the long stride would be set to thirty-two bits.

Figure 3:
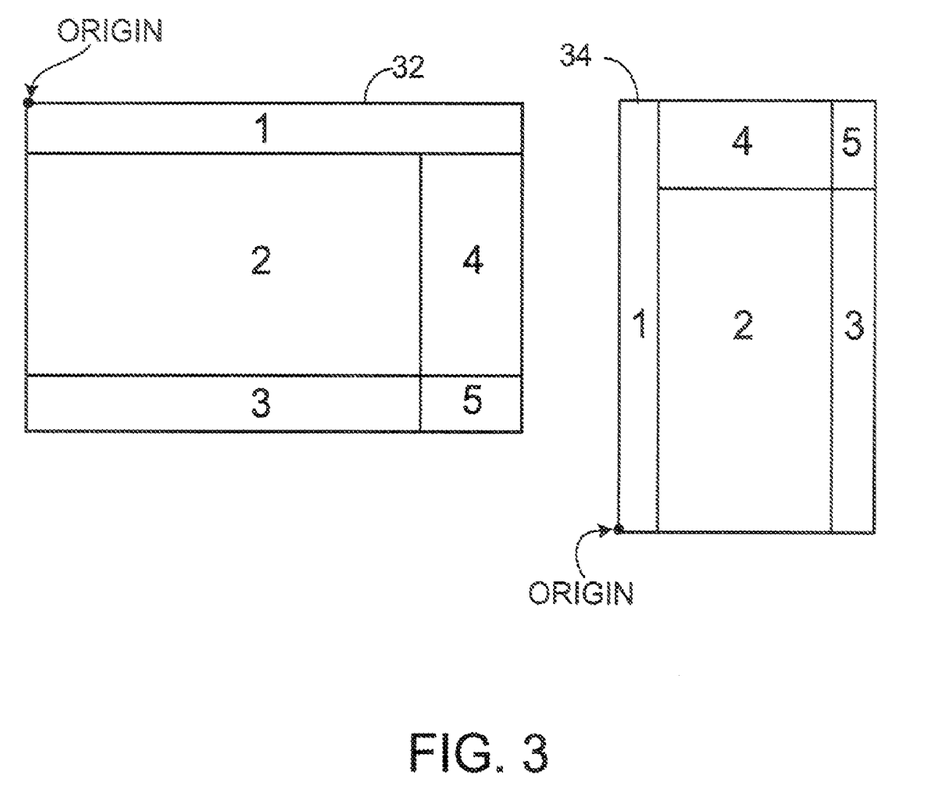
FIGS. 3 and 4 show source regions and their corresponding images in the destination array for counter-clockwise and clockwise rotation respectively.
Figure 4:
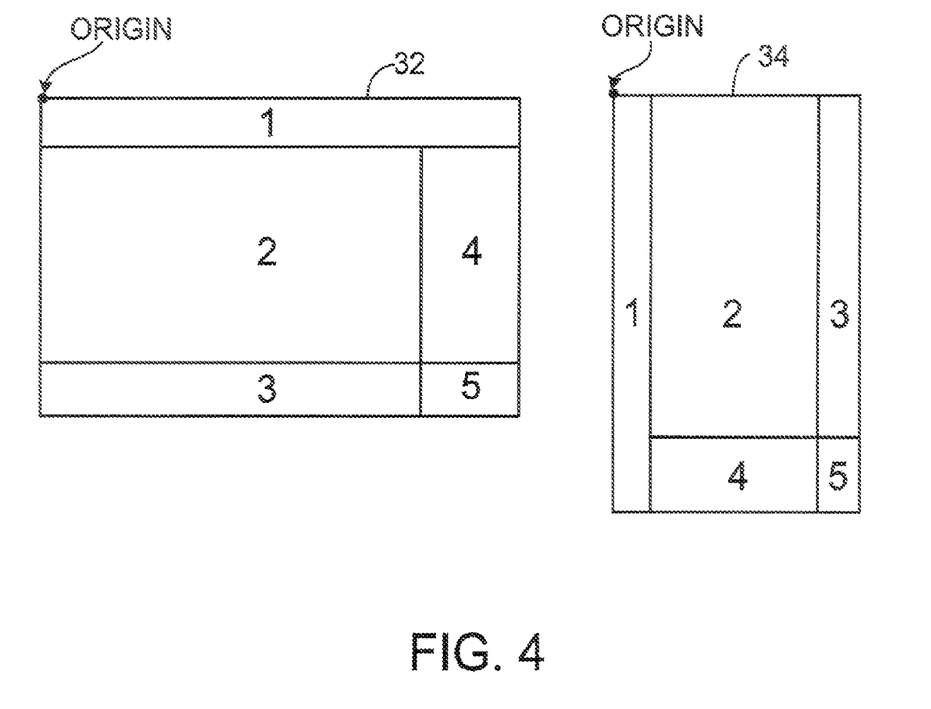

FIGS. 3 and 4 shows examples of a source array 32 that is to be rotated counter-clockwise (FIG. 3) and clockwise (FIG. 4) by ninety degrees while being copied to the destination array 34. For purposes of the copy operation, the source array 32 is divided into five distinct source regions on the basis of where the images of those regions falls relative to data chunk boundaries within the destination array 34. A particular source array 32 may or may not include all the source regions shown in FIGS. 3 and 4. For example, if the destination array 34 happens to begin at a data chunk boundary, there is no need to have region 1.

Regions 1, 3 and 5 each include at most one less row than the number of columns between data chunk boundaries in the destination array 34. The data in these regions is data that is stored in those rows of the source array 32 that occupy only a portion of the columns between two data chunk boundaries in the destination memory 22. The data in regions 2 and 4 is data stored in those rows of the source array 32 that occupy all the columns between two data chunk boundaries in the destination memory 22. The data in regions 4 and 5 is data stored in those columns of the source array 32 that occupy only a portion of the columns between two data chunk boundaries in the source memory 30. As suggested by the absence of regions analogous to regions 4 and 5 on the left side of the source array 32, the source array 32 has its first column aligned with a data chunk boundary of the source memory 30. However, the method described herein can readily be adapted to a case in which this is not so.

Data stored in regions 1, 3, and 5 is moved to the destination array 34 in short strides, one bit at a time. Data stored in region 4 is moved to the destination array 34 in one-dimensional long strides that extend one data chunk at a time.

Data stored in region 2 is moved to the destination array 34 in two-dimensional long strides that define blocks extending one-data chunk in both dimensions. One method of implementing the two-dimensional long stride is to copy eight consecutive bytes, one from each successive row of the source array 32, into two 32-bit register variables. This avoids the overhead of repeatedly accessing the source memory 30.

The methods for carrying out the clockwise and counter-clockwise rotations are essentially identical. The salient exception, which is suggested by the difference between the locations of the copy regions in the source arrays 32 of FIGS. 3 and 4, is that in clockwise rotation, the source array is read from bottom to top, whereas in counter-clockwise rotation, the source array 32 is read from top to bottom. This permits the destination array 34 to be addressed from left to right.

The process of transferring bits from the source array 32 (i.e. "source bits") to the destination array 34 is accelerated considerably by copying selected bytes from a row of the source array 32 into a temporary register and executing certain masking and shifting operations. This procedure is particularly useful when the code for manipulating the rows is written in C++, since that language provides the ability to mask a register with a selected mask and then shift the result of the masking operation all in a single step.

The foregoing procedure is illustrated in detail in connection with FIG. 5, which shows how selected source bits from two rows of a source array 32 are moved into a corresponding two columns in the destination array 34. The technique illustrated in FIG. 5 can readily be adapted to accommodate different numbers of rows in the source array 32 and different byte boundary locations in the destination array 34.

Figure 5:
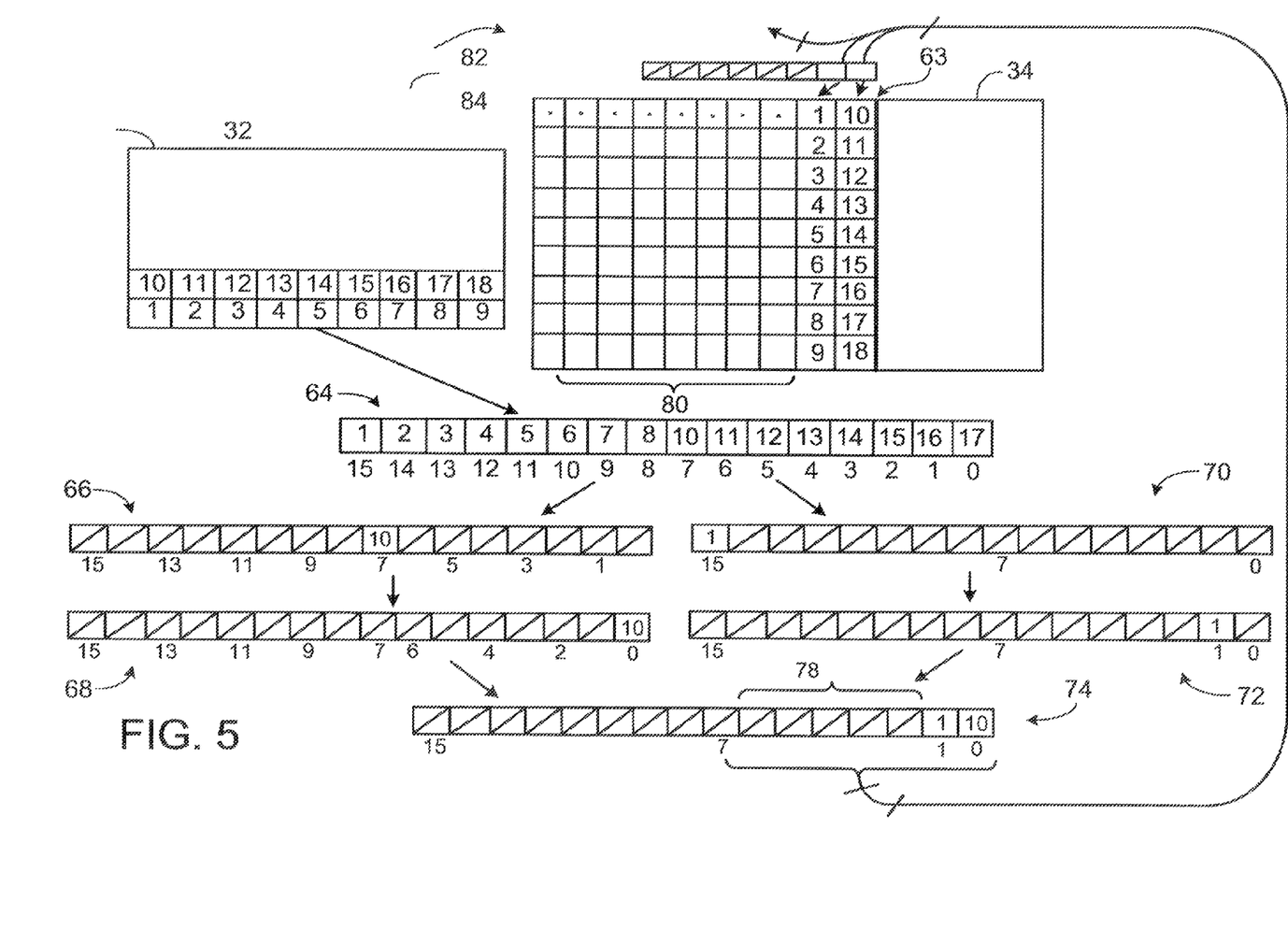
FIG. 5 shows several stages in the process of copying source bits to a destination byte.

In the example shown in FIG. 5, a byte boundary exists between the second and third columns of the destination array 34. Hence, the two rows can be viewed as forming region 1 in the source array 32 shown in FIG. 4, and the two columns can be viewed as forming the corresponding region 1 in the destination array 34, also shown in FIG. 4. The rotation is assumed to be clockwise. Hence, the source array 32 is processed beginning with the last row and moving upwards.

The first step in the procedure is to copy the first byte of each of the two rows (i.e. source bits 1-7 and source bits 10-17) into an intermediate register. The register is then masked to zero all elements except the source bit at location 7 (i.e. bit 10). This is carried out, for example, by AND'ing the register with a hexadecimal 80 mask. The result is then shifted so that the bit formerly at register location 7 is shifted to register location 0. The result is a register in which all bits are zero except the least significant bit, which is set to correspond to source bit 10 of the source array 32.

The procedure is then repeated, except this time, the mask is a hexadecimal 8000 mask that zeroes out all bits except that at location 15 (i.e. source bit 1) and the shift causes the bit at location 15, which corresponds to source bit 1, to be moved to register location 1. The result is a register in which all bits are zero except the bit at location 1, which is set to correspond to source bit 1 from the source array 32.

The result of this mask-and-shift operation is then added to the result of the preceding mask-and-shift operation. This results in an intermediate register in which source bits 1 and 10 are now next to each other in precisely the required order for placement into the first row of the destination array 34.

The next step is to place the source bits, now conveniently stored at register locations 0 and 1 of the intermediate register, into the correct location in the destination array 34, which in this case is the first two columns of the first row of the destination array 34. However, as noted earlier, memory access is carried out on a byte-by-byte basis. As a result, when one retrieves the bits at locations 0 and 1 of the intermediate register, one also retrieves their byte-mates, namely the bits at locations 2-7. Consequently, if one were to simply copy the bits at locations 0 and 1 into a destination byte in the destination array 34, one would inevitably copy their byte-mates at locations 2-7 into the destination byte as well. This would have the undesirable effect of overwriting some of the mark's static portion.

To prevent the static portion of the mark from being partially overwritten, the destination byte is first masked to shield selected bits from being overwritten by the byte-mates of the desired two bits. In this case, there are six bits to be shielded. Hence, this is achieved by AND'ing the destination byte with hexadecimal FC (i.e. 1111 1100), which will have six set bits to protect the content of the first six bits from the six byte-mates, and two cleared bits to allow the two desired source bits to overwrite the corresponding two bits in the destination byte.

The mask used in this operation depends on how many and which bits are to be protected. For example, if the byte-boundary were located such that there were five byte-mates to be shielded from, the appropriate mask would be hexadecimal FB (i.e. 1111 1000) instead. In those cases in which all the bits from a particular byte of the intermediate register are to be copied into the destination byte (i.e. for processing region 2), the appropriate mask would be hexadecimal 0.

When represented in LISP-like instructions, the method described above can be viewed as setting the value of the destination byte to the outcome of the following expression:

```
(+  (+  (Right_Shift 6 (AND Source_Byte HEX-80))
        (Right_Shift 15 (AND Source_Byte HEX-8000))
    )
    (AND Destination_Byte HEX-FC)
)
```

In C++, the same method can be implemented in instructions such as the following:

```
for ( ; dst <= dstBottomPtr; dst += temp0)
{
*dst =     ((Reg10 & 0x80) >> 6) +
           ((Reg10 & 0x8000) >> 15) +
           (*dst & 0xFC);
*(dst+RowSize) = ((Reg10&0x40) >> 5) +
           ((Reg10&0x4000) >> 14) +
           (*(dst+RowSize)& 0xFC);
```

The source bits required to fill the first eight rows of region 1 in the destination array 34 are all available in the intermediate register. These source bits can be isolated and moved to the appropriate location by suitable masking and shifting operations as described above. The foregoing procedure, with the mask changed to isolate the desired source bit is thus repeated for the next seven rows of the destination array 34 without having to again access the source memory 30. Once all the source bits in the intermediate register have been copied into the destination array 34, another memory access is made to retrieve additional bits, if any, from the source array 32 and to repeat the procedure described above.

The memory access method has been described in detail in connection with the transfer of bits from region 1 of the source array 32 to region 1 of the destination array 34 with the byte boundary assumed to be at a particular location. With minor variation in the masks used and in the extent and direction of the shift, the foregoing method can readily be adapted to transfer bits between any two regions shown in FIGS. 3 and 4.

Having described the invention, and a preferred embodiment thereof, what we claim as new, and secured by Letters Patent is:

1. A method for marking an article of merchandise with content represented by a bitmap stored in a rectangular source array of a source memory, the method comprising:
   within a destination memory, identifying a rectangular destination array having
      a first region having boundaries aligned with boundaries of a first data chunk of the destination memory, and
      a second region having boundaries aligned with a second data chunk of the destination memory, the first data chunk being larger than the second data chunk;
   copying a first region of the source array onto the first region of the destination array in units of the first data chunk; and
   copying a second region of the source array onto the second region of the destination array in units of the second data chunk.

2. The method of claim 1, further comprising, providing the destination array to a marking device for marking the article with content represented by the destination array.

3. The method of claim 1, further comprising selecting the first data chunk to be a byte and selecting the second data chunk to be a bit.

4. The method of claim 1, further comprising selecting the first data chunk to be a word and selecting the second data chunk to be a byte.

5. The method of claim 1, further comprising selecting the first data chunk to be a long word and selecting the second data chunk to be a word.

6. The method of claim 1, further comprising:
   defining a third region of the source array, the third region having boundaries aligned with third data chunk boundaries of the destination memory, the third data chunk being smaller than the second data chunk; and copying the third region of the source array onto a third region of the destination array in units of the third data chunk.

7. The method of claim 6, further comprising selecting the first data chunk to be a word, selecting the second data chunk to be a byte, and selecting the third data chunk to be a bit.

8. The method of claim 1, wherein copying a first region of the source array comprises copying an integral number of first data chunks from a selected row of the source bitmap.

9. The method of claim 8, wherein copying a second portion of the source array comprises copying second data chunks from the selected row o source array.

10. The method of claim 1, further comprising selecting the first and second regions of the destination array such that the bitmap is stored in the destination array with an orientation different from the orientation in which the bitmap is stored in the source array.

11. The method of claim 1, further comprising selecting the first and second regions of the destination array such that the bitmap is stored in the destination array with an orientation that is rotated by a right angle relative to the orientation in which the bitmap is stored in the source array.

12. The method of claim 1, wherein copying a first region of the source array onto the first region of the destination array comprises copying the first region in units of a two dimensional block having a length and width that are integral multiples of an extent of the first data chunk.

13. A computer-readable medium having encoded thereon software for causing the marking of an article of merchandise with content represented by a bitmap stored in a source array of a source memory, the software comprising instructions that, when executed by a computer, cause the computer to within a destination memory, identify a rectangular destination array having a first region having boundaries aligned with boundaries of a first data chunk of the destination memory, and a second region having boundaries aligned with a second data chunk of the destination memory, the first data chunk being larger than the second data chunk;

copy a first region of the source array onto the first region of the destination array in units of the first data chunk; and copy a second region of the source array onto the second region of the destination array in units of the second data chunk.

14. An apparatus for marking an article of merchandise, the apparatus comprising:

a source memory for storage of a source array;

a destination memory for storage of a destination array;

a processor in data communication with the source memory and the destination memory; and a computer-readable medium in data communication with the source, the medium having encoded thereon software for causing the article of merchandise to be marked with content represented by a bitmap stored in the source array, the software including instructions that, when executed by a computer, cause the computer to within a destination memory, identify a rectangular destination array having a first region having boundaries aligned with boundaries of a first data chunk of the destination memory, and a second region having boundaries aligned with a second data chunk of the destination memory, the first data chunk being larger than the second data chunk;

copy a first region of the source array onto the first region of the destination array in units of the first data chunk; and copy a second region of the source array onto the second region of the destination array in units of the second data chunk.

15. The apparatus of claim 14, further comprising a printer in data communication with the destination memory.

* * * * *